United States Patent [19]

Lavie

[11] Patent Number: 4,769,244

[45] Date of Patent: Sep. 6, 1988

[54] NON-HYGROSCOPIC WATER-SOLUBLE PULVERULENT COMPOSITION FOR THE PREPARATION OF DRINKS AND PROCESS FOR ITS PREPARATION

[75] Inventor: Louis Lavie, Lausanne, Switzerland

[73] Assignee: Dridrinks N.V., Curacao, Netherlands Antilles

[21] Appl. No.: 8,770

[22] Filed: Jan. 30, 1987

[30] Foreign Application Priority Data

Feb. 11, 1986 [CH] Switzerland ............... 543/86

[51] Int. Cl.$^4$ .................................. A23L 2/40
[52] U.S. Cl. ............................. 426/96; 426/591
[58] Field of Search ............ 426/591, 96, 573, 302

[56] References Cited

U.S. PATENT DOCUMENTS

| | | | |
|---|---|---|---|
| 3,082,091 | 3/1963 | Smith | 426/591 |
| 3,667,962 | 6/1972 | Fritzberg | 426/591 |
| 4,143,163 | 3/1979 | Hutchison et al. | 426/96 |
| 4,540,587 | 9/1985 | Gajewski | 426/96 |
| 4,579,742 | 4/1986 | Lavie | 426/591 |

FOREIGN PATENT DOCUMENTS

| | | | |
|---|---|---|---|
| 1417937 | 12/1975 | European Pat. Off. | |
| 0130144 | 1/1985 | European Pat. Off. | 426/591 |

*Primary Examiner*—George Yeung
*Attorney, Agent, or Firm*—Stevens, Davis, Miller & Mosher

[57] ABSTRACT

A non-hygroscopic water-soluble pulverulent composition for the preparation of drinks which release gas over a prolonged period comprises a mixture of a first constituent with a second constituent which react with one another in the presence of water to release gas, each of the said constituents being coated or impregnated with a film comprising xanthan gum. The coating is carried out using aqueous solutions of xanthan gum to which sucrose or sucrose derivatives have been added if necessary.

13 Claims, No Drawings

4,769,244

NON-HYGROSCOPIC WATER-SOLUBLE PULVERULENT COMPOSITION FOR THE PREPARATION OF DRINKS AND PROCESS FOR ITS PREPARATION

SUMMARY OF THE INVENTION

The present invention relates to a non-hygroscopic pulverulent composition for the preparation of nutritional or non-nutritional drinks which release gas over a prolonged period. The invention also relates to a process for the preparation of the said composition.

BACKGROUND OF THE INVENTION

The fizzy drinks market, more particularly the market for the sparkling lemonades known as soft drinks or diet drinks, is steadily growing. From the industrial point of view, however, its development is coming up against the cost of transportation and of the relatively large number of handling operations associated with a heavy and bulky product. Attempts are currently being made to solve such problems by spreading the production centers as far apart as possible and only transporting concentrated extracts, in the dry or liquid state.

In the appropriate industrial plants, these extracts are treated with water, sugar, if necessary, and then $CO_2$ under high pressure before being packaged in hermetically sealed containers which are pressure-resistant and hence relatively heavy and bulky. The "fizzy" quality of these drinks when consumed is then provided, inter alia, by the gradual release of the dose of $CO_2$ initially dissolved therein.

Pulverulent dry extracts based on sodium bicarbonate and edible acids are also known which can be made into fizzy drinks by adding water just before consumption. However, the aeration of the drink which can be achieved with these extracts does not compare, in terms of its duration and its "fizziness", to that which results from the dissolution of $CO_2$ under pressure. It is also found that, in numerous cases, the ingredients essential for the desired organoleptic effect, for example phosphoric and citric acids or sodium bicarbonate, are particularly hygroscopic and thereby impair the stability of the packaged mixtures.

The chemical and pharmaceutical industries produce and use polymers for coating drugs. Some of these polymers are suitable for protecting dry extracts from moisture uptake and for partially controlling the reaction between the acids and the carbonates. Not having been designed for this purpose, they have disadvantages such as coloring the froth or deposits in the glass. Moreover, their ability to control the release of $CO_2$ from the drink and keep it uniform is far from perfect.

In the field of effervescent drinks more particularly, certain solutions have already been put forward. U.S. Pat. No. 2.868.646 recommends the use of water-soluble gums to coat crystalline mixtures of edible acids and bicarbonates, in the presence of high proportions of sugar. This method is unsuited to the use of phosphoric acid as well as to the preparation of so-called diet drinks which are low in calories.

U.S. Pat. No. 3.082.091 describes the use of vegetable gums, in particular guar gum, for coating the sodium bicarbonate. Although relatively stable in the dry state, the bicarbonate coated in this way does not enable a controlled release of gas once it has been brought into contact with water and acid. U.S. Pat. No. 3,667,962, which recommends the use of water-soluble porous matrices based essentially on dextrins, in which acids and carbonates are dispersed, is also unable to give the desired effects.

The most remarkable effects have so far been obtained using the coating method defined in European Patent Application No. A-0 130 144. The acid and carbonate constituents are each coated or impregnated with a liquor based on water-soluble macromolecular polysaccharides of vegetable origin, such as gum arabic and gum tragacanth. To obtain the desired properties, the solutions of macromolecular polysaccharides are first subjected to a moderate heat treatment in the presence of ethyl alcohol.

THE INVENTION

The object of the present invention is to obtain results which are comparable if not superior to those obtained by the method described in European Patent Application No. A-0 130 144, while at the same time avoiding the prior treatment of the polysaccharides. The invention relates to a pulverulent composition as defined in claim 1 and to a process for its preparation as defined in claim 5.

PREFERRED EMBODIMENTS OF THE INVENTION

Surprisingly, it has in fact been discovered that, in contrast to the water-soluble macromolecular polysaccharides employed hitherto, which are all of vegetable origin, xanthan gum has properties such that simple aqueous solutions thereof make it possible to achieve the desired effects. This suggests that the manner in which xanthan gum is precipitated, by the addition of isopropanol to the aqueous solution resulting from the microbiological treatment, might be modifying its rheological behavior in solution in a similar way to the treatment of polysaccharides of vegetable origin with ethyl alcohol. It has been found, moreover, that these effects can be achieved using very much smaller amounts of xanthan gum, thereby resulting in a substantial simplification of the coating operations.

Xanthan gum is an exocellular polysaccharide of microbiological origin which is produced by the culture of specific microorganisms: Xanthomonas campestris. It is used especially as a thickener and stabilizer in the food industry. Its industrial-scale production is perfectly controlled from both the quantitative and qualitative points of view. Xanthan gum therefore has the additional advantage of not being subject to the hazards of products of natural origin, which depend, inter alia, on the changes in climatic conditions of the production regions.

The dissolution of any proportion of xanthan gum in water, even 1%, with or without the addition of sucrose, forms a gel.

The present invention makes it possible to obtain, in a particularly advantageous manner, a pulverulent composition whose constituents are effectively protected from moisture uptake and which, once water has been added, makes it possible to prepare a fizzy drink whose aeration is totally comparable, in terms of both its duration and its "fizziness", to that obtained by means of the industrial plants known hitherto.

According to the invention, the composition contains, as the first constituent, a carbonic acid salt or a mixture of carbonic acid salts, such as an alkali metal carbonate or bicarbonate, an alkaline earth metal carbonate or a carbonic acid salt of an amino acid. It preferably contains sodium bicarbonate.

It also contains, as the second constituent, an organic acid or a mixture of organic acids, such as citric, tartaric, malic or ascorbic acid, and/or a mineral acid such as phosphoric acid.

In accordance with the process of the invention, the constituents of the composition are impregnated or coated with an aqueous solution of xanthan gum, if necessary treated with sucrose or burnt sugar. Good results can be obtained using aqueous solutions containing 1 or 2% by weight, these limiting values not being absolute. Of course, the proportions and concentrations of the solutions can vary with the nature of the problems encountered and can be adapted accordingly. Given the very small amounts of coating solutions used—both solutions with sugar and, even more so, purely aqueous solutions—they are perfectly suitable for the preparation of basic compositions for low-calorie drinks known as diet drinks. Coating solutions with sugar will be used without any restriction to obtain so-called soft drinks, which have a higher sugar content.

As far as the acid constituents are concerned, their impregnation need only make it possible to obtain a good protection of the products from hygroscopicity and a slight slowing-down of the dissolution in order to stabilize the pH as a function of the reaction time. As regards the carbonates, it is necessary to ensure that the reaction is controlled as a function of the chosen aeration time as well as to provide protection from hygrocopicity.

Using the said solutions, each of the constituents of the composition can easily be impregnated either by mixing the chosen products and solution under mechanical pressure or by dissolving the desired products in the minimum amount of water required. The operations for mixing under mechanical pressure can be carried out with the aid of e.g. a mortar or a ball mill.

If desired, it is also possible to incorporate other ingredients such as colors or organoleptic ingredients, for example caramel color, natural sweeteners such as sucrose, fructose or stevioside (extract of Stevia rebaudiana Bertoni), artificial sweeteners such as saccharin, cyclamates or aspartam, a variety of essential oils or mixtures thereof, or plant extracts such as caffeine, quinine, tolu or soluble kola nut extract. These complementary ingredients will then be distributed according to their affinity with one or other of the reactive components of the effervescent mixture.

In some cases, the water-soluble ingredients can be incorporated into the coating solutions. In other cases, especially where the water-insoluble components are concerned, they will be added separately—preferably adsorbed on a solid carrier—once the coating process is complete.

When the chosen ingredients have been suitably coated, the resulting product is then desiccated and, if necessary, reduced to powder. The desiccation can be suitably carried out by moderate heating, for example between 15° and 30° C., under a partial vacuum, by drying under a high vacuum at low temperature, by freeze-drying or in a stream of hot air, for example at 40° C. The desiccation will be continued until the water content of the impregnated product has been reduced to a maximum of about 0.5 to 1% by weight.

If necessary, the product resulting from desiccation is then pulverized by the customary techniques and, if appropriate, stored until it is finally used.

The selected ingredients can then be divided up into unit doses suitable for the preparation of fizzy drinks by simply adding water.

Some of the embodiments of the invention are illustrated with the aid of the examples below. These examples in no way imply a limitation.

EXAMPLE 1

An aqueous solution containing 1% of xanthan gum (food grade—KELTROL T—marketed by KELCO, 20 N. Wacker Dr., Chicago, Ill. 60606, USA) was prepared first by dssolving 2 g of the said gum in 198 g of water at room temperature.

50 g of pulverulent sodium bicarbonate were then coated with 5 g of the 1% solution of xanthan gum by mixing the ingredients in a mortar. After a homogeneous product had been obtained, it was dried on a sieve for 1 h at 40° C. and finally reduced to powder.

Gum coating rate: 0.10% by weight.

The bicarbonate coated in this way can be used in the following manner to prepare a basic pulverulent composition for a fizzy drink (amount for 300 ml):

2 g of sodium bicarbonate coated by the above method, and 3 g of a mixture of phosphoric, tartaric and citric acids (3:30:17) coated by the method described in European Patent Application No. A-0 130 144.

When cold water is added, the resulting mixture produces a controlled effervescence of gas which continues for about 35 min.

EXAMPLE 2

An aqueous solution of xanthan gum (food grade—KELTROL T) was prepared in the following manner:

4 g of powdered xanthan gum and 100 g of water.

The resulting solution was then used to coat the following mixture of acids:

3 g of phosphoric acid, 17 g of anhydrous citric acid and 30 g of ground tartaric acid, at a rate of 2.5 g of solution per 50 g of acid mixture. When the ingredients had been reduced to a homogeneous mass, the resulting product was dried on a fine mesh in a stream of hot air and finally reduced to powder in a mortar.

Gum coating rate: 0.20% by weight.

This acid mixture can then be used to prepare a basic pulverulent composition for a fizzy drink (amount for 300 ml):

2 g of sodium bicarbonate coated by the method of Example 1, and 3 g of the acid mixture coated by the above method.

After cold water has been added to the above mixture, a uniform effervescence of gas is observed for about 35 min.

EXAMPLE 3

An aqueous solution of xanthan gum (food grade—KELTROL T), with sugar, was prepared from the following ingredients:

4 g of xanthan gum, 46 g of ground sucrose and 100 g of water.

The resulting solution containing sugar was then used to coat the following mixture of acids:

3 g of phosphoric acid,
17 g of anhydrous citric acid and
30 g of ground tartaric acid, at a rate of 2.5 g of solution per 50 g of acid mixture. When the ingredients had been reduced to a homogeneous mass, the resulting product was dried on a fine mesh in a stream of hot air and finally reduced to powder in a mortar.

Coating rate with gum/sucrose mixture: 1.66% by weight.

The acid mixture coated in this way can then be used to prepare a basic pulverulent composition for a fizzy drink (amount for 300 ml):

2 g of sodium bicarbonate coated by the method of Example 1, and
3 g of the acid mixture coated by the above method.

After cold water has been added to the above mixture, a uniform effervescence of gas is observed for about 35 min.

What I claim is:

1. A non-hygroscopic water-soluble pulverulent composition for the preparation of drinks which release gas over a prolonged period, which comprises a mixture of a first constituent with a second constituent which react with one another in the presence of water to release gas, each of the said constituents being coated or impregnated with a film comprising xanthan gum.

2. A composition as claimed in claim 1, wherein the coating or impregnating film includes sucrose or burnt sugar.

3. A composition as claimed in claim 1 or claim 2, wherein the first constituent contains a carbonic acid salt or a mixture of carbonic acid salts.

4. A composition as claimed in claim 1 or claim 2, wherein the second constituent contains a mineral or an organic acid or a mixture of mineral and organic acids.

5. The composition as claimed in claim 3, wherein the carbonic acid salt is an alkali metal carbonate or bicarbonate, an alkaline earth metal carbonate or a carbonic acid salt of an amino acid.

6. The composition as claimed in claim 4, wherein the organic acid is phosphoric, citric, tartaric, malic or ascorbic acid.

7. A process for the preparation of a non-hygroscopic watersoluble pulverulent composition for the preparation of drinks which release gas over a prolonged period, comprising a mixture of a first constituient with a second constituient which react with one another in the presence of water to release gas, comprising the steps of separately coating or impregnating the constituents with an aqueous solution of xathan gum, separately drying each of the said coated or impregnated constituients and mixing the dried, constituents in predetermined proportions.

8. The process as claimed in claim 7, wherein the aqueous solution of xanthan gum includes sucrose or burnt sugar.

9. The process as claimed in claim 7 or claim 8, wherein the coating or impegnation is carried out by mixing the constituents under mechanical pressure or by dissolving the constituents.

10. The process as claimed in claim 7, wherein the first constituent contains a carbonic acid salt or a mixture of carboic acid salts.

11. The process as claimed in claim 7 wherein the second constituient contains a mineral or an organic acid or a mixture of mineral and organic acids.

12. The process as claimed in claim 10, wherein the carbonic acid salt is an alkali metal carbonate or bicarbonate, an alkaline earth metal carbonate or a carbonic acid salt of an amino acid.

13. The process as claimed in claim 11, wherein the organic acid is phosphoric, citric, tartaric, malic or ascorbic acid.

* * * * *